(12) United States Patent
Ferlitsch et al.

(10) Patent No.: US 8,505,074 B2
(45) Date of Patent: Aug. 6, 2013

(54) SELECTIVE WEB CONTENT CONTROLS FOR MFP WEB PAGES ACROSS FIREWALLS

(75) Inventors: Andrew Rodney Ferlitsch, Camas, WA (US); Eric Thomas Olbricht, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 718 days.

(21) Appl. No.: 12/276,176

(22) Filed: Nov. 21, 2008

(65) Prior Publication Data

US 2010/0132026 A1    May 27, 2010

(51) Int. Cl.
*G06F 7/04* (2006.01)
*G06F 15/173* (2006.01)

(52) U.S. Cl.
USPC ............... 726/4; 709/223; 709/224; 709/225

(58) Field of Classification Search
USPC .................. 726/4, 11; 709/219–225, 245
See application file for complete search history.

(56) References Cited

U.S. PATENT DOCUMENTS

| | | | |
|---|---|---|---|
| 6,233,618 B1 | 5/2001 | Shannon | |
| 6,947,986 B1 | 9/2005 | Huang et al. | |
| 7,154,635 B2 * | 12/2006 | Oyama | 358/1.9 |
| 7,260,730 B2 * | 8/2007 | Sakaue | 713/310 |
| 7,325,193 B2 * | 1/2008 | Edd et al. | 715/255 |
| 7,334,126 B1 | 2/2008 | Gilmore et al. | |
| 7,383,282 B2 | 6/2008 | Whitehead et al. | |
| 7,392,510 B1 * | 6/2008 | Treder et al. | 717/128 |
| 7,698,400 B1 * | 4/2010 | Beloussov et al. | 709/223 |
| 7,716,331 B2 * | 5/2010 | Le Pennec et al. | 709/225 |
| 7,730,094 B2 * | 6/2010 | Kaler et al. | 707/785 |
| 7,797,164 B2 * | 9/2010 | Junger et al. | 705/304 |
| 7,854,009 B2 * | 12/2010 | Kim et al. | 726/26 |
| 7,921,289 B2 * | 4/2011 | Teijido et al. | 713/166 |
| 8,161,124 B2 * | 4/2012 | Yoshida et al. | 709/206 |
| 2001/0014895 A1 | 8/2001 | Sappal | |
| 2002/0069366 A1 * | 6/2002 | Schoettger | 713/201 |
| 2002/0083344 A1 | 6/2002 | Vairavan | |
| 2003/0061515 A1 | 3/2003 | Kindberg et al. | |
| 2004/0187028 A1 * | 9/2004 | Perkins et al. | 713/201 |
| 2005/0108358 A1 * | 5/2005 | Jarvis et al. | 709/217 |
| 2006/0041637 A1 | 2/2006 | Jerrard-Dunne | |

FOREIGN PATENT DOCUMENTS

| | | |
|---|---|---|
| JP | 10-013654 | 1/1998 |
| JP | 2002-108870 | 4/2002 |
| JP | 2003-186764 | 7/2003 |
| JP | 2004-005046 | 1/2004 |
| JP | 2008-134770 | 6/2008 |
| WO | WO 01/63443 A2 | 8/2001 |
| WO | WO 02/29597 A1 | 4/2002 |

* cited by examiner

*Primary Examiner* — Saleh Najjar
*Assistant Examiner* — Feliciano Mejia
(74) *Attorney, Agent, or Firm* — Brooks Acordia IP Law, PC; Pejman Yedidsion; David Ripma

(57) ABSTRACT

Devices, methods, and computer-readable media for tagging web page content according to a content access level for entry into a web page content database, and filtering in response to a dynamic web page construction request based on the access level of the requesting source.

23 Claims, 6 Drawing Sheets

SELECTIVE WEB CONTENT CONTROLS FOR MFP WEB PAGES ACROSS FIREWALLS

FIELD OF ENDEAVOR

The present invention in its several embodiments relates generally to managing access control to content of web pages, and more particularly the invention relates to the control of web page content of multi-function peripheral (MFP) devices within and outside of a firewall.

BACKGROUND

Modern network filters, e.g., routers and server firewalls, are typically configured to block content based on static characteristics. Filtering may be based on a specific web page, e.g., URL filtering, or a specific type of content, e.g., keyword detection/filtering. Generally, this type of filtering is effective where providers produce content and published it, in a static format, to the Internet.

Modern web pages, e.g., Web 2.0, are generally constructed using page templates, e.g., Ruby on Rails, which are filled dynamically with content from a database. Each section of the template identifies the type of contact to populate the page. At run-time, a server-side scripting language, e.g., APS, PHP, makes the content request per section from a database, e.g., Oracle™, and MySQL™, and then populates the page. FIG. 1A depicts a run-time population of a web page 110 from a data store 120 having a content database where regions, e.g., content_1 111, content_2 112, and content_3 113, are drawn from the database and placed into the web page 110. Thus, as shown in the FIG. 1A prior art depiction, content is not tied to a specific web page. Instead, content is independent of the one or more web pages and may be fed into different pages, different locations, or different content may be selected for a fixed location on a web page based on a dynamic condition. Thus, using traditional access controls for limiting access to either a web site or a web page do not provide adequate means to selectively control access on a content basis.

Dynamic web page content may be drawn from multiple sources, and the dynamic web page itself may not be coupled to a specific Uniform Resource Locator (URL). Surfing by navigating web pages is changing to surfing by requesting. A request is fulfilled by dynamically obtaining relevant information from a database and constructing a structured view of the data by combining the data with a template responsive to the request. For example, on many modern major Web 2.0 sites, when the user surfs the sites, the user may note that the URL in the address bar never changes. That is, the users are in effect no longer searching web pages and instead are invoking requests.

The content served by the MFP device via web requests may include both static framed web pages with some variable data and dynamically constructed instances of content (e.g., content management system, like Joomla!™ and Drupal™). The frequency of dynamically constructed instances increases with the increase in MFP devices having functionality consistent with Web 2.0 features. Filtering based on a specific URL address may prove impractical when the web pages are dynamically constructed. The absence of a predetermined set of content, sufficiently static to define for filter rules and limitations may be attributed to the content being dynamically constructed from both the user and operator, and its form of presentation, i.e., its rendering, may not be predicted.

FIG. 1B depicts a top level process block diagram where micro-formats support the tagging of selected areas/regions of a web page as an informational canvas that is independent of the rendering of the web page and in doing so may be responsive to a request. In FIG. 1B, a micro-format reader 115 may read the micro-formats of a plurality of informational canvases 125, e.g., canvas_1 121 and canvas_2 122, each having been micro-tagged, and identifying canvas_1 via its micro-tag 130. Typically, the micro-format syntax uses the same syntax as the native format, e.g., hypertext markup language (HTML), but is ignored by the rendering engine of the browser. Instead, plug-ins can be added to web browsers to separately parse and perform an action when micro-formats are present. Additionally, web scrapping applications can be written to also take advantage of micro-formats that may be embedded in a web page.

SUMMARY

For purposes of the present invention, a firewall is any number of security schemes that prevent unauthorized access to a computing device or a network of computing devices, and in doing so, may monitor transfers of information to and from the computing device and/or the network of computing devices. Embodiments of the present invention include one or more multi-function peripheral (MFP) devices behind a firewall where the one or more MFP devices are networked with the web server for accessing web pages specific to each MFP device via an access control process. In addition, the access control process within the firewall allows access to the web pages of the MFP devices from one or more authorized dealers from outside the firewall. Accordingly, the access control process, e.g., the assigning of access control on individual web content that may be independent of the web pages, provides selective content control of MFP web pages both within and outside of a customer's firewall. That is, the access control to web content may be set for both access from within and access from outside of the firewall.

An exemplary apparatus or device embodiment of the present invention may be a computing device that comprises a processing unit and addressable memory, where the processing unit is configured, having loaded computer executable instructions or by special circuitry, or a combination of both, to execute one or more instructions (not necessarily in the following order) to: (a) determine a web content access level of a web page content requestor; (b) determine one or more elements of web page content available to the web page content requestor based on a content access level identifier of one or more tagged elements of web page content and based on the determined web content access level of the web page content requestor; and (c) output the one or more elements of a web page determined as available to the web page content requestor. In some device embodiments, the processing unit may be further configured to tag one or more elements of web page content with a content access level identifier. In some device embodiments, the one or more elements of web page content may be stored to a multi-function peripheral device data store according to a data structure and where at least one of the one or more elements of web page content of the data structure is tagged with an access level identifier. In still other embodiments, the multi-function peripheral device data store may be behind a firewall and the web page content request may originate from outside the firewall. In some computing device embodiments, the processing unit, having loaded computer executable instructions or by special circuitry, or a combination of both, is further configured to determine the web content access level based on whether the request of the web page content requestor has negotiated a firewall; and the processing unit is further configured to determine the one or more elements of web page content available to the web page content requestor based on a network address of the web page content requestor. Two, three, or more access levels may be embodied. A three-level access level embodiment may be described where the processing unit is further configured to determine (not necessarily in the following order): (a) the one or more elements of web page content, having an intra-site web page content access level identifier, that are available to the web page content requestor determined as having an intra-site web page content access level; (b) the one or more elements of web page content, having an inter-site web page content access level identifier, that are available to the web page content requestor determined as having an inter-site web page content access level; and (c) the one or more elements of web page content, having an extra-site web page content access level identifier, that are available to the web page content requestor determined as having an extra-site web page content access level.

A machine-enabled method of web page content management comprising (not necessarily in the following order): (a) determining a web content access level of a web page content requestor; (b) determining one or more elements of web page content available to the web page content requestor based on an access level identifier of one or more tagged elements of web page content and based on the determined web content access level of the web page content requestor; and (c) outputting the one or more elements of a web page determined as available to the web page content requestor. In some process embodiments, the method may further comprise tagging one or more elements of web page content with an access level identifier. In some process embodiments, the method may further comprise storing the one or more elements of web page content to a multi-function peripheral device data store according to a data structure and tagging with an access level identifier at least one of the one or more elements of web page content of the data structure. While some embodiments may employ a multi-functional peripheral device, the multi-function peripheral device data store of some embodiments may be operationally behind a firewall and the process may further include the step of the web page content requestor originating a web page content request from outside the firewall. Some machine-enabled methods may be described where the step of determining the web content access level is based on whether the request of the web page content requestor has negotiated a firewall; and the determining of the one or more elements of web page content available to the web page content requestor is based on a network address of the web page content requestor. In addition, other machine-enabled method embodiments may be described where the determining of one or more elements of web page content available to the web page content requestor further comprises (not necessarily in the following order): (a) determining the one or more elements of web page content, having an intra-site web page content access level identifier, available to the web page content requestor determined as having an intra-site web page content access level; (b) determining the one or more elements of web page content, having an inter-site web page content access level identifier, available to the web page content requestor determined as having an inter-site web page content access level; and (c) determining the one or more elements of web page content having an extra-site web page content access level identifier, available to the web page content requestor determined as having an extra-site web page content access level.

A computer-readable medium embodiment of the present invention may have computer-executable instructions stored thereon which, when executed by a computer, are operative to cause the computer (not necessarily in the following order) to: (a) determine a web content access level of a web page content requestor; (b) determine one or more elements of web page content available to the web page content requestor based on an access level identifier of one or more tagged elements of web page content and based on the determined web content access level of the web page content requestor; and (c) output the one or more elements of web page determined as available to the web page content requestor. For some embodiments, computer-executable instructions stored on the computer-readable medium, when executed by a computer, may be further operative to cause the computer to tag one or more elements of web page content with an access level identifier. Some computer-readable medium embodiments, when executed by a computer, are further operative to cause the computer to determine the web content access level based on whether the request of the web page content requestor has negotiated a firewall; and to determine the one or more elements of web page content available to the web page content requestor based on a network address of the web page content requestor. In addition, some computer-readable medium embodiments, when executed by a computer, are further operative to cause the computer to determine (not necessarily in the following order): (a) the one or more elements of web page content, having an intra-site web page content access level identifier, that are available to the web page content requestor determined as having an intra-site web page content access level; (b) the one or more elements of web page content, having an inter-site web page content access level identifier, that are available to the web page content requestor determined as having an inter-site web page content access level; and (c) the one or more elements of web page content, having an extra-site web page content access level identifier, that are available to the web page content requestor determined as having an extra-site web page content access level.

BRIEF DESCRIPTION OF THE DRAWINGS

Embodiments of the present invention are illustrated by way of example and not limitation in the figures of the accompanying drawings, and in which.

DETAILED DESCRIPTION

Figure 1A:
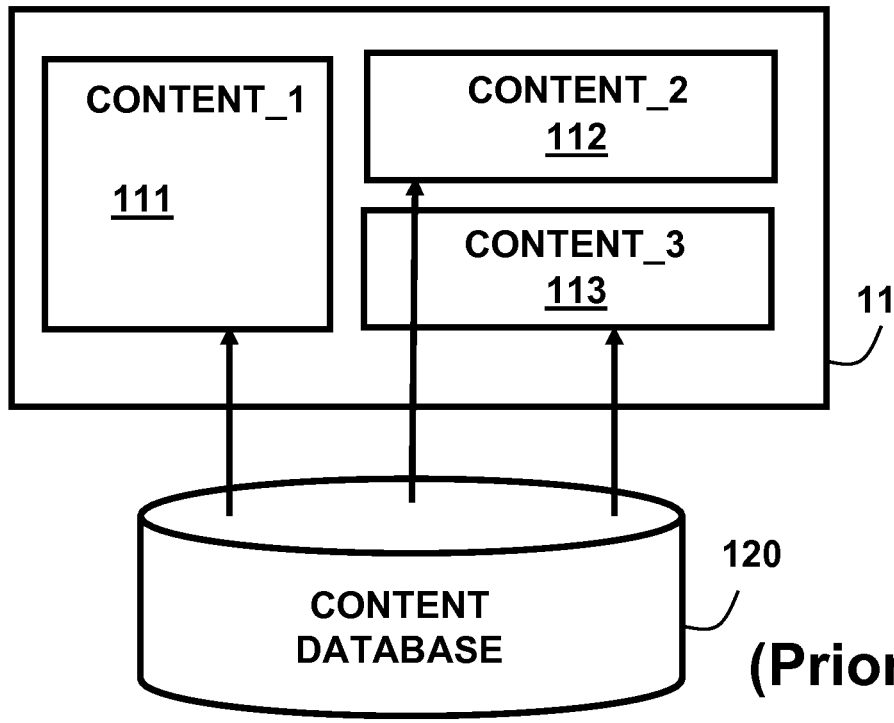
FIG. 1A illustrates a prior art depiction of providing content to a dynamic web page.
Figure 1B:
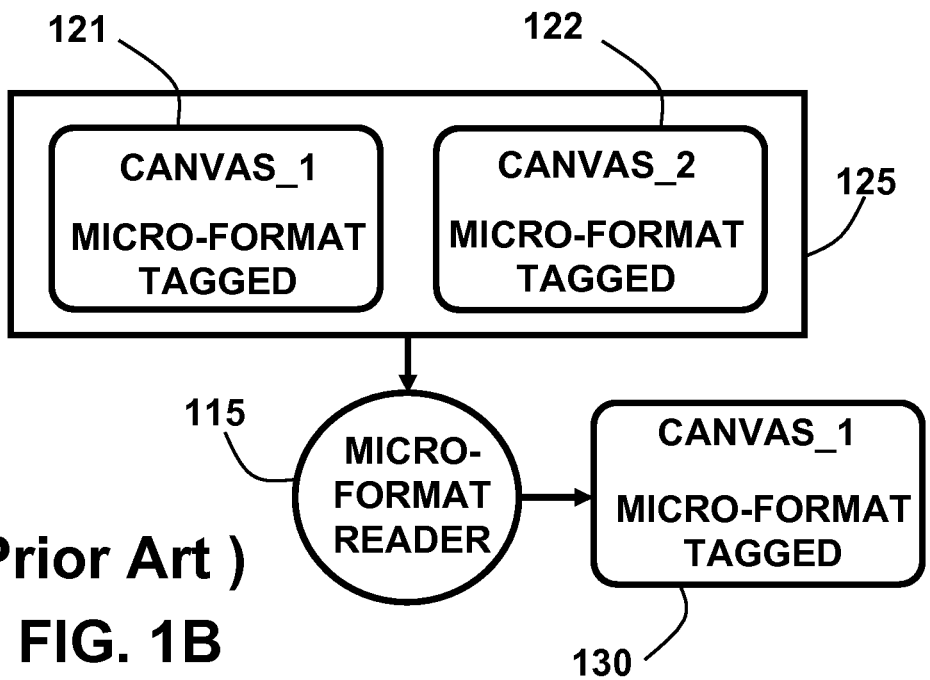
FIG. 1B illustrates a top level prior art depiction of microformat tagging of content.
Figure 2:
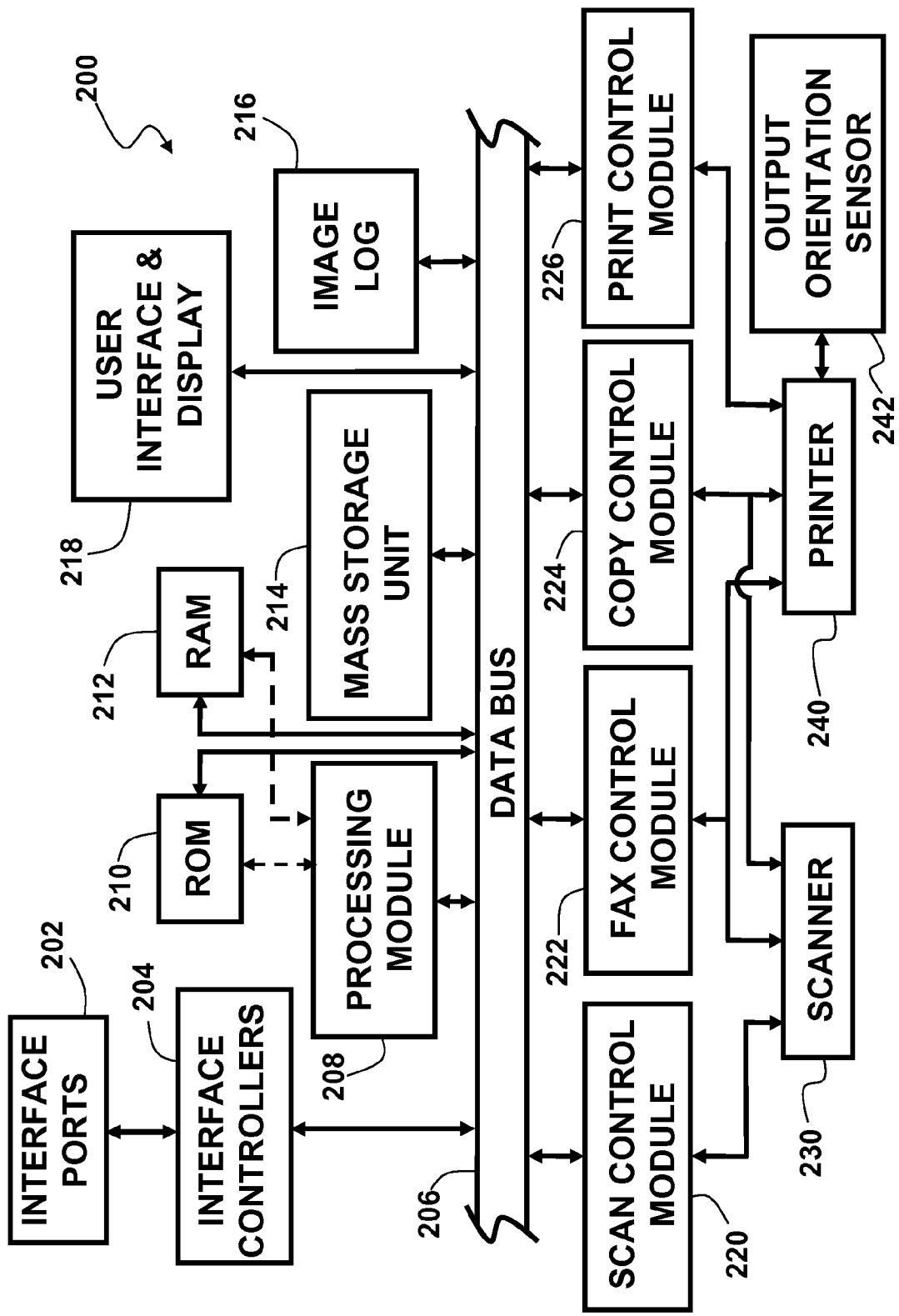
FIG. 2 illustrates a top level functional block diagram of an exemplary multi-functional peripheral device.

An exemplary MFP device may be illustrated in greater exemplary functional detail in FIG. 2. Interface ports 202 may be present to connect a printer cable, a network link, or an external wireless module. The interface ports 202 may be serviced by one or more interface controllers 204 that function to direct communications and/or condition signals between the respective interface port 202 and one or more modules of the MFP device 200 which may be in common communication via a data bus 206. The MFP device 200 may include one or more processing modules 208 that may draw data from read-only memory (ROM) 210 and exchange data with random access memory (RAM) 212 and may store files having sizes greater than the RAM 212 capacity in one or more mass storage units 214. The MFP device 200 may maintain a log of its images 216 and have a user display and interface 218. The image log 216 may be a separate module or distributed, for example, with a portion executed via the processing module 208 that may access parameters, files, and/or indices that may be stored in ROM 210, RAM 212, a mass storage unit 214 or in combination thereof. The MFP device 200 may include as individual or separate modules a scan control module 220, a facsimile (FAX) control module 222, and a copy control module 224 where each module may service the scanner 230 to direct communications and/or condition signals between the scanner 230 and one or more modules of the MFP device 200, for example, via the data bus 206. The MFP device 200 may include as individual or separate modules the FAX control module 222, the copy control module 224, and a print control module 226 where each module may service the printer 240 to direct communications and/or condition signals between the printer 240 and the one or more modules of the MFP device 200, for example, via the data bus 206. The exemplary MFP device 200 may store a calibration table in ROM 210, RAM 212, a mass storage unit 214 or in combination thereof and accordingly, the calibration table may be accessed by the print control module 226 and/or a processing module 206 and made available to devices external to the MFP device 200 via one or more interface ports 202. The exemplary MFP device 200 may have notice, for example, due to a user input via the user interface 218 or sensed by an output orientation sensor 242 of the printer 240 and may be communicated via the print control module 226 to devices external to the MFP device 200 via one or more interface ports 202.

Figure 3:
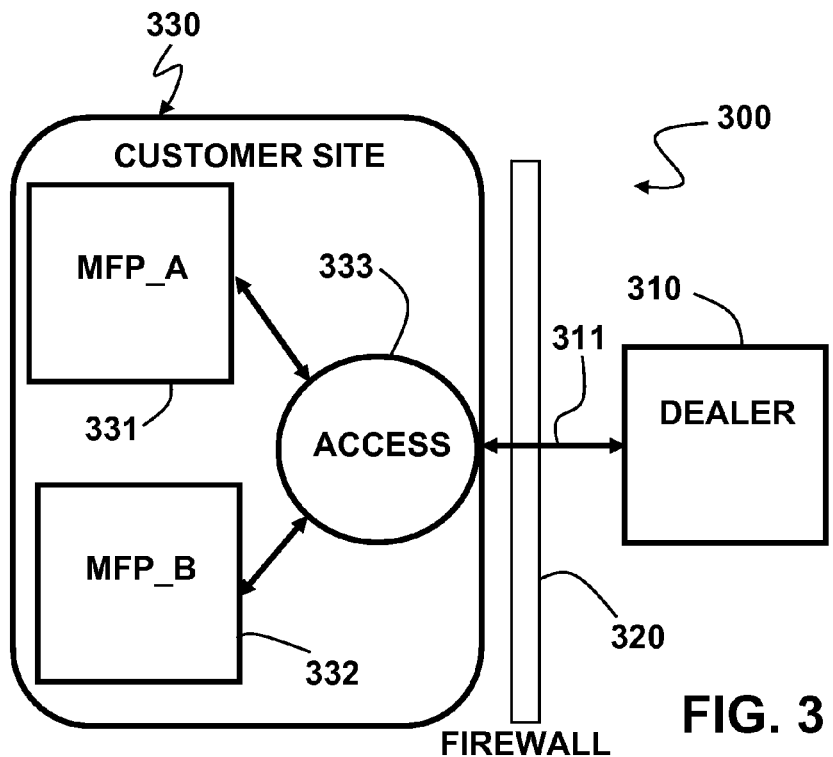
FIG. 3 illustrates an exemplary top level system embodiment of the present invention.

An exemplary system embodiment may have one or more MFP devices behind a firewall. FIG. 3 depicts a scenario 300 where a computing node 310 external to, or outside of, the firewall 320, may be an MFP dealer who leases MFP devices to a customer and the customer locates the leased MFP devices 331,332 at a customer site 330 behind, or inside of, the firewall 320. Access processing 333 determines the content that may be retrieved and placed into an MFP dynamic web page. An MFP may have an embedded web server comprising one or more embedded web pages specific to the MFP. For the external computing node 310 to have access to any of the content stored behind the firewall, it must first be granted network access to communicate 311 through the firewall 320. One or more of the embedded web pages has dynamic content, i.e., content that is generated and specific to the moment that the web page is requested. Examples of dynamic content may include: (a) printer condition; (b) printer clicks; (c) pending jobs; (d) job history; and (e) maintenance history. Additionally, a node outside of the firewall, e.g., a dealer node, may be granted limited or full access through the firewall via a security access tunnel to one or more of the MFP devices, e.g., customer nodes, behind the firewall. The security access tunnel permits the authorized node, e.g., an authorized customer dealer, but not others, to access the MFP's web pages from outside the firewall.

By pre-tagging the content while it is stored in the database, the need for static web pages in order to anticipate content locations is obviated. Additionally, the content may be tagged in a way to limit where the content may be viewed relative to a corporate firewall. This is particularly useful for fleets of MFP devices which are managed by corporate IT, behind the firewall, and serviced by remote dealers via remote access thru the firewall. Content in the MFP devices that the corporate user would consider private and not want to be shared with the remote dealers may include information on filed jobs. Some exemplary scenarios have one or more MFP devices owned by a dealer and leased to a leasee. In such a scenario, there may be additional content in the MFP device that the dealer would rather not be shared with the corporate information technology (IT) department of the leasee.

According to the present invention, exemplary embodiments of the corporate IT of an MFP leasee and an MFP owner/dealer have content that may be labeled as viewable by: (a) only corporate IT (intrasite); (b) only a dealer (extrasite); and (c) both corporate IT and dealer (intersite). When a web URL request is made to the MFP device, the MFP constructs a web page response by obtaining the relevant data from the database and framing it into a presentation. As part of the web page construction, an indicator may be added, e.g., a "rel" tag, to the content to establish the level of access to the content. The content of the web page may then be filtered dynamically by removing, i.e., not extracting and positioning, content that is restricted according to the determined origin of the web request.

The tagging of the content stored in the database occurs with the process that stores the data. In our case, this tagging mechanism would occur in the MFP. The MFP may have some set of configurable rules for setting limitations on types of content. Access to some rules and/or content limitations may be limited to corporate information technology (IT) of a customer or user of the one or more MFP devices, while access to other rules and/or content limitations may be limited to the remote dealer, i.e., a node of a provider or maintainer of the customer's MFP devices. In some embodiments, the filtering occurs in the web server within the MFP. In some embodiments, the filtering occurs in the MFP device or in a firewall proxy, e.g., a route switch processor, which may be added to the corporate/customer firewall. The MFP device/firewall proxy may then filter content according to the tags associated with the content and where the web request originates based on for example, IP addresses.

Figure 4:
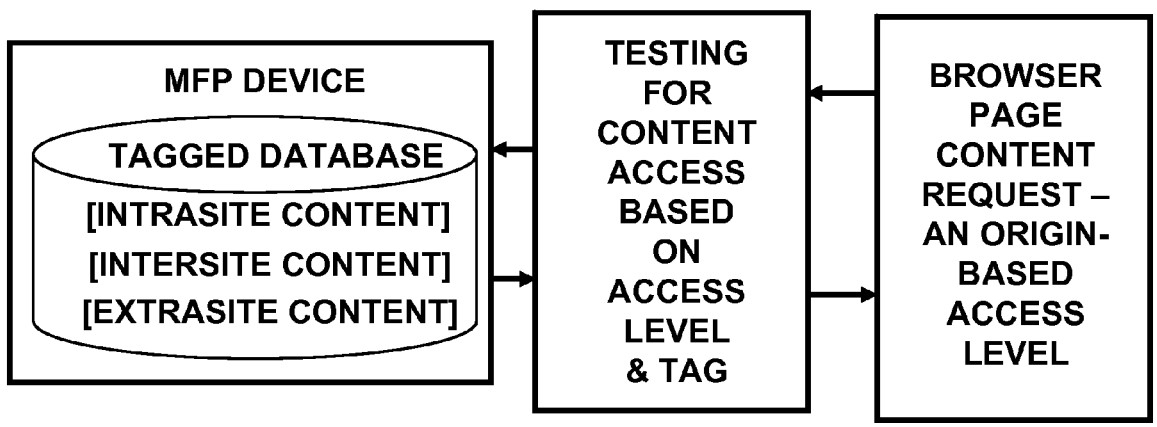
FIG. 4 illustrates an exemplary top level flow of request and content according to the present invention.

Web content from an MFP device may be partitioned into one of three classes of general access control, e.g., for an external communication node of an MFP dealer seeking web pages of leased MFP devices through a firewall. The exemplary classes are: (a) intra-site; (b) inter-site; and (c) extra-site and as illustrated in FIG. 4 as being stored in the date store of an MFP device. The particular names of the classes are not meant as limitations in that the invention is not intended to be limited to the names used herein. Rather, the names of classes are used to identify the classes of general access control having particular characteristics. For example, intra-site content may be accessed exclusively from behind the firewall. Intra-site content may include private and/or proprietary information such as an address book, pending jobs, such as print jobs, and/or job histories, such as print job histories. Inter-site content may be accessed from behind the firewall and by one or more authorized nodes outside of the firewall. Inter-site content may include private and/or proprietary information exchanged between a node behind the firewall and an authorized node outside the firewall, such as printer clicks and printer condition. Extra-site content may be accessed exclusively from an authorized node outside the firewall. Extra-site content may include private/proprietary information of the authorized node, such as a maintenance history of an MFP device behind the firewall.

The dynamic content of the web pages of the MFP device may be stored in a database or comparable construct or data structure via one or more date stores. An independent element or piece of dynamic web content may be stored in such a database where the web content is pre-tagged, or otherwise made identifiable, according to an access category. The content pre-tagging, e.g., via micro-format tagging, may be effected at a location in the web page of the MFP device where the content is inserted based on the source of the request for the web page.

A pseudo-code example is as follows:

```
<div id="PrinterClicks" rel="intersite">
    ...
</div>
```

Figure 5:
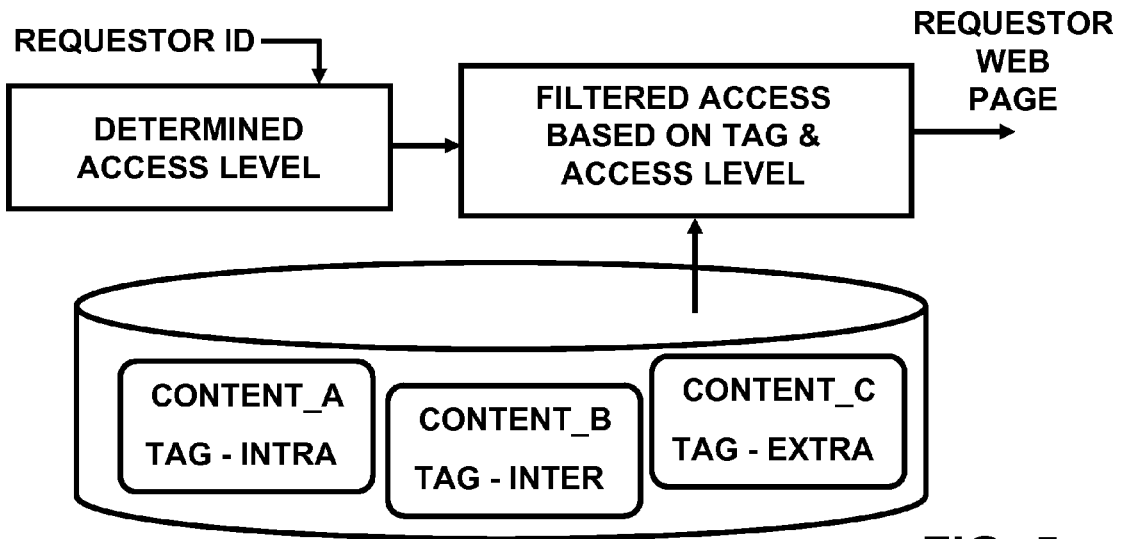
FIG. 5 illustrates an exemplary top level flow of request and content according to the present invention.
Figure 6:
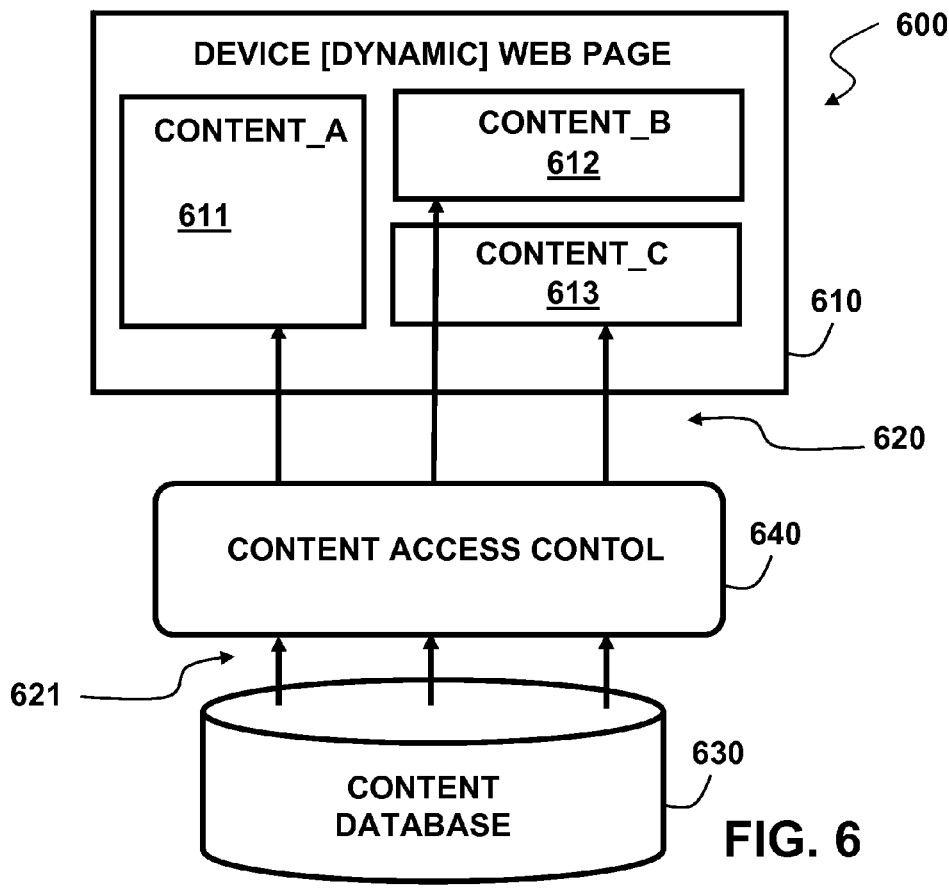
FIG. 6 illustrates an exemplary top level flow of request and content according to the present invention.

Accordingly, the content for an MFP device may be illustrated in FIG. 5 where the pre-tagged content is associated via micro-tagging with its intended viewing audience—based on the source of the request; Content_A is shown with an "intra" tag, Content_B is shown with an "inter" tag, and Content_C is shown with an "extra" tag.

The content pre-tagging may be dynamically determined. For example, the content pre-tagging may be based on run-time conditions where the content may be inserted into the web page of the MFP device, such as by executing the instructions of server-side scripting, via for example PHP. For example,

```
<?php
    if ( true==condition1 )
        $access = "intrasite";
    else if ( true == condition2)
        $access = "extrasite";
    else
        $access = "intersite";
    ...
?>
```

In another example, an attribute may be stored with the web content in the database or other data structure of an MFP device. Exemplary pseudo-code or extended markup language (XML) may express this dynamic determination as follows:

```
<?xml..>
<content access="intersite">
    <location>...</location>
</content>
```

The access condition may also be configurable by an administrator and/or dealer on a per web content chunk, such as through an administrative web interface.

MFP Web Page Template

An MFP web page comprises a template 600 for dynamic creation of the web page 610, where the template indicates: (a) locations 611, 612, 613 to render independent pieces of web content, and (b) instructions and/or paths 620 to obtain and insert the corresponding web content 621 from a content database at an MFP data store 630. Additionally, web content 621 which is to be inserted 620 at run-time into the web page 610 may first be processed by a content access control process 640 to determine accessibility to the web content for purposes of populating the web page, or not, with particular web content.

Content Access Control

Figure 7:
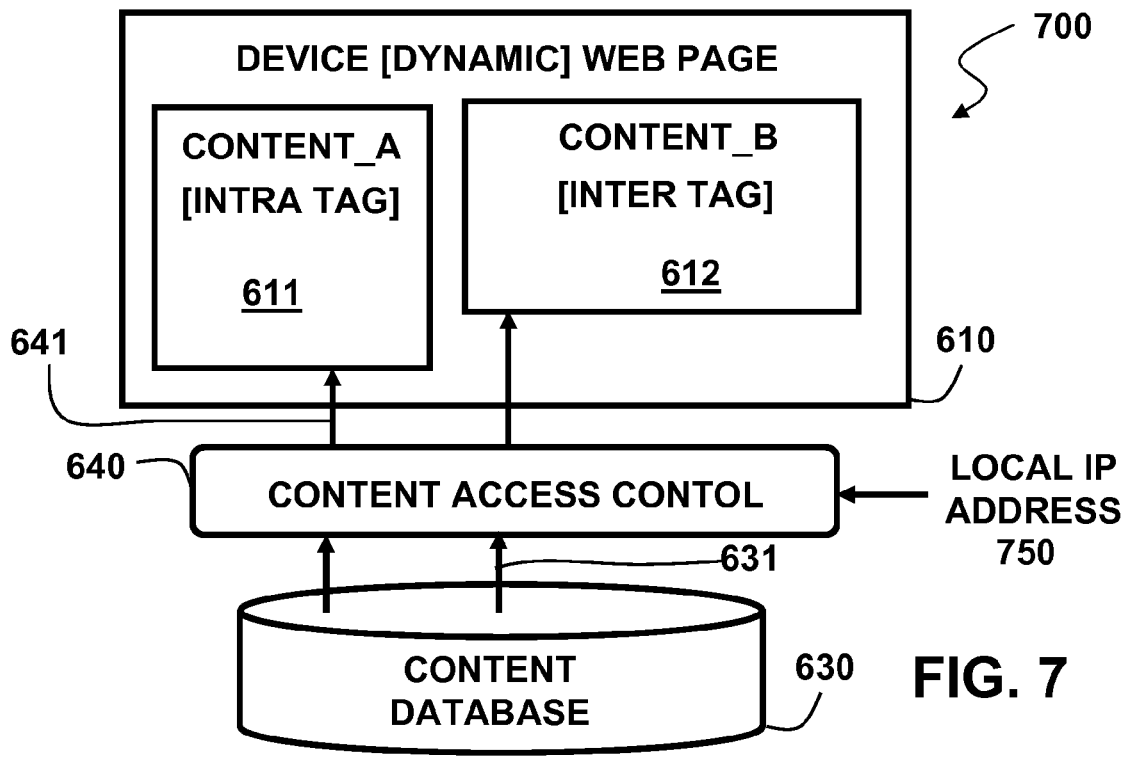
FIG. 7 illustrates an exemplary top level flow of request and content according to the present invention.

When the MFP web page is dynamically constructed, and web content is obtained from the content database and inserted into the web page, the content access control of the obtained and inserted web content may be exercised. FIG. 7 depicts a scenario 700 where web content, e.g., Content_A 611, of the content database may be tagged as intrasite. The internet protocol (IP) address 750 of the requesting process, e.g., a node having a web browser on a PC behind the firewall, may be identified so that it may be determined, via the content access control 640, whether the node originating the web page request indeed is an IP address within the firewall. If the IP address is within the firewall, the web content is added 641 to the web page. If the IP address is not within the firewall, then the web content is not added. In some embodiments, the region of the web page where the web content would otherwise have been added, e.g., the region shown as Content_A 611, is rendered as a blank region. In some embodiments, the region of the web page where the web content would otherwise have been added is not rendered at all. If the content is tagged as intersite, then access to the content 631 may be granted without establishing or testing whether the IP of the requesting node is behind or outside of the firewall. Accordingly, without additional testing, the content access control 640 allows the intersite content to populate the web page requesting the content, e.g., at Content_B 612.

Figure 8:
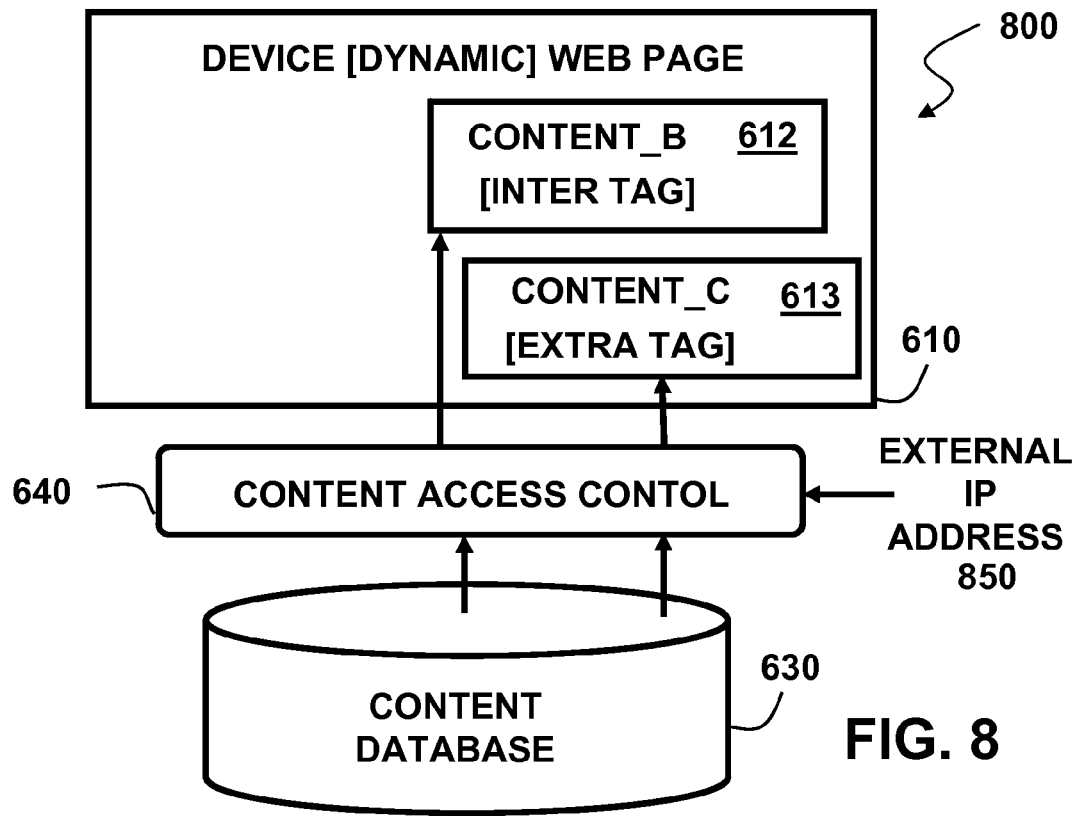
FIG. 8 illustrates an exemplary top level flow of request and content according to the present invention.

FIG. 8 depicts a scenario 800 where the content is tagged as extrasite. Via the content access control processing, a determination of content access for populating the requesting web page may be based on the IP address of the requesting node, e.g., a web browser of a requesting site. That is, the IP address of the requesting node may be compared with a list or table entry of a data store in order to determine whether the IP address is not one identified as behind the firewall. If the IP address is determined to be outside of the firewall, i.e., an external IP address 850, by for example, its absence on a list or table entry, and access through the firewall has been granted to the requesting node having the external IP address, then the web content may be allowed to be added to the web page. FIG. 8 shows Content_C 613 as a region populating the web page 610. If the IP address is not behind the firewall and access through the firewall has not been granted to the requesting node, then the web content is not added. In some embodiments, the region of the web page where the web content would otherwise have been added is rendered as a blank region. In some embodiments, the region of the web page where the web content would otherwise have been added is not rendered at all.

Figure 9:
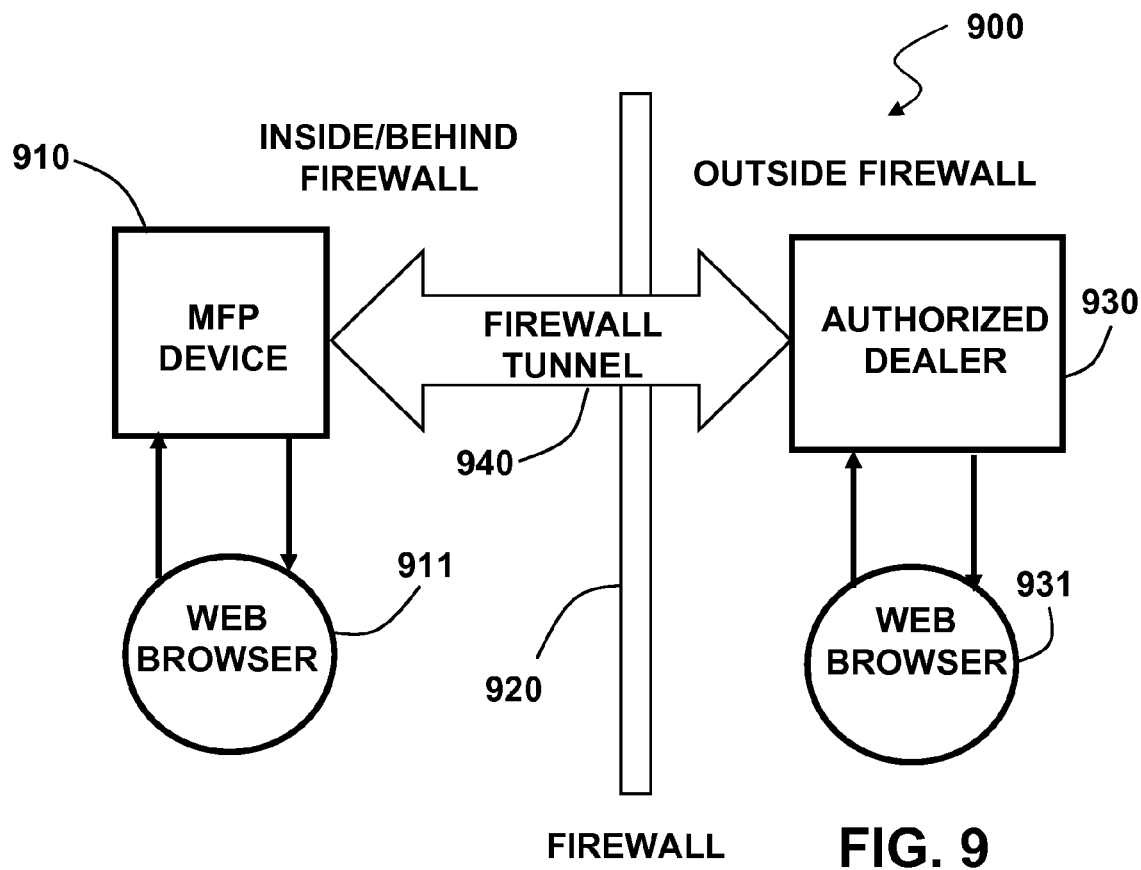
FIG. 9 illustrates an exemplary top level system embodiment of the present invention.

The exemplary scenario of FIG. 8 may be shown as an exemplary system 900 in FIG. 9 where at least one MFP device 910 having a web browser 911 is inside of, or behind a firewall 920, and an authorized dealer 930 as an external node having a web browser 931 outside of the firewall. The external node 930 has access to the MFP device via a firewall tunnel 940, e.g., by using encapsulated data packets in a communication session and having negotiated a firewall encryption protocol to establish the session. In this exemplary scenario, the external node may be able to form a dynamic web page at its web browser that includes the web page content of the MFP that had been tagged "extra."

Figure 10:
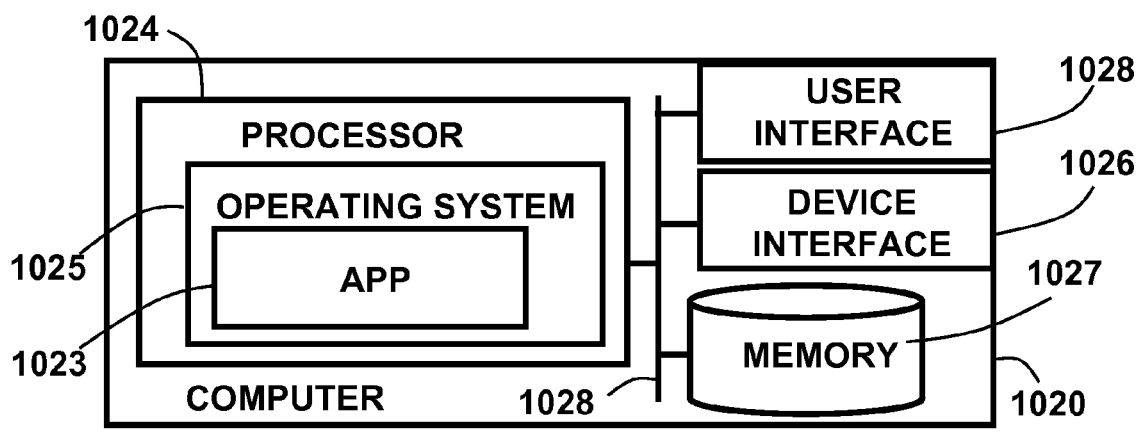
FIG. 10 illustrates an exemplary top level functional block diagram of a physical computing device embodiment of the present invention.

Accordingly, by pre-tagging the web page content as it is entered into the database, embodiments of the present invention may provide for filtering/access schema without modifying the structure of the database of an MFP device used for generating dynamic web pages. The access control processing may be executed via the MFP device processing or may be executed at a separate computing node behind the firewall or via a firewall proxy. FIG. 10 depicts a separate computing node as an alternative exemplary operating environment for the content access control processing. The exemplary operating environment is shown as a computing device 1020 comprising a processor 1024, such as a central processing unit (CPU), addressable memory 1027, an external device interface 1026, e.g., a universal serial bus (USB) port and related processing, and/or an Ethernet port and related processing, and an optional user interface 1028, e.g., an array of status lights and one or more toggle switches, and/or a display, and/or keyboard and/or pointer-mouse system and/or a touch screen. These elements may be in communication with one another via a data bus 1028. Via an operating system 1025 such as a real-time operating system (RTOS), the processor 1024 may be configured to execute steps of a content tagging and/or access management application 1023 according to the exemplary embodiments of the present invention.

Based on the foregoing, it should be appreciated that systems, methods, and computer-readable media for MFP device dynamic web page filtering across firewalls via pre-tagging are provided herein. One of ordinary skill in the art will also appreciate that the modules and functions described herein may be further subdivided, combined, and/or varied and yet still be in the spirit of the embodiments of the invention. In addition, while a number of variations of the invention have been shown and described in detail, other modifications, which are within the scope of this invention, will be readily apparent to those of ordinary skill in the art based upon this disclosure, e.g., the exemplary flowcharts or processes described herein may be modified and varied and yet still be in the spirit of the invention. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above.

What is claimed is:

1. A computing device for determining a level of available content according to an access category, the computing device comprising:
   a processing unit and addressable memory; wherein the processing unit is configured to:
      determine a web content access level of a request from a web page content requestor, wherein the web content access level is based on a network address of the web page content requestor and based on a firewall access tunnel; and
      determine one or more elements of web page content available to the web page content requestor based on a content access level identifier of the one or more elements of web page content and based on the determined web content access level of the web page content requestor, wherein access to the one or more elements of web page content is available based on a set of rules for determining a level of available content, the set of rules comprising:
         grant access to a first subset of the one or more elements of web page content available to the web page content requestor if the web page content is tagged as having an intra-site content access level identifier and if the network address of the web page content requestor is within the firewall access tunnel;
         grant access to a second subset of the one or more elements of web page content available to the web page content requestor if the web page content is tagged as having an extra-site content access level identifier and if the network address of the web page content requestor is not within the firewall access tunnel; and
         grant access to each of the one or more elements of web page content available to the web page content requestor if the web page content is tagged as having an inter-site content access level identifier, without establishing if the network address of the web page content requestor is within the firewall access tunnel.

2. The computing device of claim 1 wherein the processing unit is further configured to determine the web content access level based on whether the request of the web page content requestor has negotiated a firewall.

3. The computing device of claim 1 wherein the processing unit is further configured to determine: (a) the one or more elements of web page content, having an intra-site web page content access level identifier, that are available to the web page content requestor determined as having an intra-site web page content access level; (b) the one or more elements of web page content, having an inter-site web page content access level identifier, that are available to the web page content requestor determined as having an inter-site web page content access level; and (c) the one or more elements of web page content, having an extra-site web page content access level identifier, that are available to the web page content requestor determined as having an extra-site web page content access level.

4. The computing device of claim 3 wherein
   if the determined web content access level of the web page content requestor is determined as having an intra-site web page content access level, the web page content comprises at least one of: an address book, pending jobs, and job histories.

5. The computing device of claim 3 wherein
   if the determined web content access level of the web page content requestor is determined as having an inter-site web page content access level, the web page content comprises at least one of: printer clicks and printer conditions.

6. The computing device of claim 3 wherein
   if the determined web content access level of the web page content requestor is determined as having an extra-site web page content access level, the web page content comprises a maintenance history of a multi-functional peripheral device.

7. The computing device of claim 1 wherein the processing unit is further configured to tag one or more elements of web page content with a content access level identifier.

8. The computing device of claim 1 wherein the one or more elements of web page content are stored to a multi-function peripheral device data store according to a data structure and wherein at least one of the one or more elements of web page content of the data structure is tagged with an access level identifier.

9. The computing device of claim 8 wherein the multi-function peripheral device data store is behind a firewall and a web page content request originates from outside the firewall.

10. The computing device of claim 1 wherein the processing unit is further configured to:
output the one or more elements of the web page content determined as available to the web page content requestor.

11. The computing device of claim 1 wherein the one or more elements of web page content is generated dynamically, and wherein the dynamically generated one or more elements, accessible via the firewall access tunnel, is at least one of: (a) printer condition; (b) printer clicks; (c) pending jobs; (d) job history; and (e) maintenance history.

12. The computing device of claim 1 wherein the network address is determined as not within the firewall access tunnel based on comparing the network address of the web page content requestor with a set of table entries of a data store.

13. The computing device of claim 1 wherein if the network address is determined to be outside of the firewall access tunnel and access through the firewall access tunnel is granted to the web page content requestor having the external network address, then the one or more elements of web page content is added to the web page.

14. A machine-implemented method of web page content management for determining a level of available content according to an access category, the computing device comprising:
determining a web content access level of a request from a web page content requestor by a physical computing device, wherein the web content access level is based on a network address of the web page content requestor and based on a firewall access tunnel; and
determining by the physical computing device one or more elements of web page content available to the web page content requestor based on an access level identifier of the one or more elements of web page content and based on the determined web content access level of the web page content requestor, wherein access to the one or more elements of web page content is available based on a set of rules for determining a level of available content, the set of rules comprising:
granting access to a first subset of the one or more elements of web page content available to the web page content requestor if the web page content is tagged as having an intra-site content access level identifier and if the network address of the web page content requestor is within the firewall access tunnel;
granting access to a second subset of the one or more elements of web page content available to the web page content requestor if the web page content is tagged as having an extra-site content access level identifier and if the network address of the web page content requestor is not within the firewall access tunnel; and
granting access to each of the one or more elements of web page content available to the web page content requestor if the web page content is tagged as having an inter-site content access level identifier, without establishing if the network address of the web page content requestor is within the firewall access tunnel.

15. The machine-implemented method of claim 14 wherein the determining of the web content access level is based on whether the request of the web page content requestor has negotiated a firewall.

16. The machine-implemented method of claim 14 wherein the determining of one or more elements of web page content available to the web page content requestor further comprises: (a) determining the one or more elements of web page content, having an intra-site web page content access level identifier, available to the web page content requestor determined as having an intra-site web page content access level; (b) determining the one or more elements of web page content, having an inter-site web page content access level identifier, available to the web page content requestor determined as having an inter-site web page content access level; and (c) determining the one or more elements of web page content having an extra-site web page content access level identifier, available to the web page content requestor determined as having an extra-site web page content access level.

17. The machine-implemented method of claim 14 further comprising tagging one or more elements of web page content with an access level identifier.

18. The machine-implemented method of claim 14 further comprising storing the one or more elements of web page content to a multi-function peripheral device data store according to a data structure and tagging with an access level identifier at least one of the one or more elements of web page content of the data structure.

19. The machine-implemented method of claim 18 wherein the multi-function peripheral device data store is behind a firewall and further includes the step of the web page content requestor originating a web page content request from outside the firewall.

20. A computer-readable non-transitory medium for determining a level of available content according to an access category, the computer-readable non-transitory medium having computer-executable instructions stored thereon which, when executed by a computer, are operative to cause the computer to:
determine a web content access level of a web page content requestor wherein the web content access level is based on a network address of the web page content requestor and based on a firewall access tunnel; and
determine one or more elements of web page content available to the web page content requestor based on an access level identifier of the one or more elements of web page content and based on the determined web content access level of the web page content requestor, wherein access to the one or more elements of web page content is available based on a set of rules for determining a level of available content, the set of rules comprising:
grant access to a first subset of the one or more elements of web page content available to the web page content requestor if the web page content is tagged as having an intra-site content access level identifier and if the network address of the web page content requestor is within the firewall access tunnel;
grant access to a second subset of the one or more elements of web page content available to the web page content requestor if the web page content is tagged as having an extra-site content access level identifier and if the network address of the web page content requestor is not within the firewall access tunnel; and grant access to each of the one or more elements of web page content available to the web page content requestor if the web page content is tagged as having an inter-site content access level identifier, without establishing if the network address of the web page content requestor is within the firewall access tunnel.

21. The computer-readable non-transitory medium of claim 20 wherein the computer-executable instructions stored thereon, when executed by a computer, are further operative to cause the computer to determine the web content access level based on whether the request of the web page content requestor has negotiated a firewall.

22. The computer-readable non-transitory medium of claim 20 wherein the computer-executable instructions stored thereon, when executed by a computer, are further operative to cause the computer to determine: (a) the one or more elements of web page content, having an intra-site web page content access level identifier, that are available to the web page content requestor determined as having an intra-site web page content access level; (b) the one or more elements of web page content, having an inter-site web page content access level identifier, that are available to the web page content requestor determined as having an inter-site web page content access level; and (c) the one or more elements of web page content, having an extra-site web page content access level identifier, that are available to the web page content requestor determined as having an extra-site web page content access level.

23. The computer-readable non-transitory medium of claim 20 wherein the computer-executable instructions stored thereon, when executed by a computer, are further operative to cause the computer to tag one or more elements of web page content with an access level identifier.

* * * * *